United States Patent
Lawson et al.

(10) Patent No.: US 9,261,023 B2
(45) Date of Patent: Feb. 16, 2016

(54) SYSTEMS AND METHODS FOR MONITORING FLUID SEPARATION AND/OR MONITORING THE HEALTH OF A VALVE

(75) Inventors: William J. Lawson, Niskayuna, NY (US); Brittany L. Sater, Anderson, SC (US)

(73) Assignee: General Electric Company, Schenectady, NY (US)

( * ) Notice: Subject to any disclaimer, the term of this patent is extended or adjusted under 35 U.S.C. 154(b) by 1010 days.

(21) Appl. No.: 13/343,243

(22) Filed: Jan. 4, 2012

(65) Prior Publication Data

US 2013/0167935 A1 Jul. 4, 2013

(51) Int. Cl.
*F02C 7/22* (2006.01)

(52) U.S. Cl.
CPC ............. *F02C 7/22* (2013.01); *Y10T 137/0318* (2015.04); *Y10T 137/2931* (2015.04)

(58) Field of Classification Search
CPC ................ F02C 3/22; F02C 3/30; F02C 7/22; F02C 7/222; F02C 7/232; F02C 7/25; F02C 9/40; F02C 9/46; F02C 9/52
See application file for complete search history.

(56) References Cited

U.S. PATENT DOCUMENTS

| 4,175,443 A * | 11/1979 | Schneider et al. ............... 73/722 |
| 6,729,135 B1 * | 5/2004 | Norris et al. ..................... 60/646 |
| 8,438,830 B2 * | 5/2013 | Lawson et al. ............. 60/39.463 |
| 2009/0025396 A1 * | 1/2009 | Joshi et al. ....................... 60/773 |
| 2009/0272096 A1 * | 11/2009 | Lawson et al. ............. 60/39.463 |

FOREIGN PATENT DOCUMENTS

| CN | 1227310 | 9/1999 |
| CN | 1526050 | 9/2004 |
| CN | 101576008 | 11/2009 |

OTHER PUBLICATIONS

Chinese Patent Application No. 20131000150.X Chinese Office Action dated Aug. 17, 2015, 8 pages. (Office Action translation in not available).

* cited by examiner

*Primary Examiner* — Arun Goyal
(74) *Attorney, Agent, or Firm* — Dority & Manning, P.A.

(57) ABSTRACT

The present subject matter is generally directed to fuel systems for a gas turbine and related methods for monitoring fluid separation in the fuel systems. More particularly, the systems and methods include measuring pressure differentials and comparing the measurements to a predetermined value.

13 Claims, 7 Drawing Sheets

SYSTEMS AND METHODS FOR MONITORING FLUID SEPARATION AND/OR MONITORING THE HEALTH OF A VALVE

FIELD OF THE INVENTION

The present subject matter relates generally to gas turbines, and, more particularly to systems and methods for monitoring fluid separation and/or monitoring the health of a valve.

BACKGROUND OF THE INVENTION

Gas turbine systems are widely utilized in fields such as power generation. A conventional gas turbine system includes a compressor, one or more combustors, and a turbine. Compressed air is generated in the compressor and provided to the combustor where the compressed air is mixed with fuel and combusted. Hot combustion gases flow from the combustor to the turbine in order to drive the gas turbine system and generate power.

In gas turbine systems, a fuel system supplies fuel to the combustor. In order to avoid unintended combustion outside of the combustor, the fuel system is configured to segregate fuel bearing piping from piping bearing other system fluids such as hot air or secondary fuels. In many gas turbine systems, the fuel system utilizes an inert gas to segregate the fuel from other system fluids. In such gas turbine systems, to maintain fluid separation between the fuel and other system fluids, the fuel system fills a cavity between the piping bearing fuel and the piping bearing other system fluids with the inert gas and maintains the inert gas at a pressure greater than the pressures of the fuel and other system fluids.

Currently to maintain fluid separation in a gas turbine, the inert gas separating the fuel and other system fluids is kept at a constant predetermined pressure. The predetermined pressure is determined by adding a safety margin to a historical maximum pressure of the fuel and other system fluids based on a worst-case scenario of turbine operating conditions. This method has often resulted in very high and overly conservative inert gas pressure requirements because many factors can affect the pressures of the fuel and other system fluids such as the ambient temperature of air entering the turbine and the load on the turbine. In turn, the high inert gas pressure requirements of the current method have also resulted in high inert gas flow rates, large high pressure inert gas storage requirements, and non-flexible control limits for system operation.

Accordingly, new systems and methods for monitoring fluid separation in a gas turbine are needed that account for changes in the required pressure of the inert gas.

In addition, within the fuel system, valves are used to control the flow of the fuel and other system fluids. Maintenance of these valves is vital to the operational efficiency and safety of the gas turbine system. For example, a leaking valve may result in unscheduled shutdowns of the turbine system or dangerous mixing of fuel and other system fluids. Currently, physical inspection is the primary method of determining the maintenance condition of valves in the fuel system. However, physical inspections are expensive and time consuming because they often require taking the turbine out of operation. Also, it is difficult to account for certain valve maintenance issues via physical inspection.

Accordingly, new systems and methods for monitoring the health of valves in gas turbines are needed in order to avoid costly shutdowns.

BRIEF DESCRIPTION OF THE INVENTION

Aspects and advantages of the invention will be set forth in part in the following description, or may be obvious from the description, or may be learned through practice of the invention.

In one embodiment, a method of monitoring fluid separation in a gas turbine having a first fluid source cavity and a second fluid source cavity in flow communication with an isolation cavity. The method comprises obtaining a pressure differential between the first fluid source cavity and the isolation cavity, and comparing the pressure differential to a predetermined value.

In a further embodiment, the present subject matter discloses a gas turbine that includes a fuel cavity having a fuel contained therein, a fluid cavity having a fluid contained therein, and an inert cavity in flow communication with the fuel cavity and the fluid cavity, the inert cavity being configured to selectively maintain fluid separation between the fuel and the fluid. The gas turbine also includes a controller configured to obtain a pressure differential between the fuel cavity and the inert cavity. The controller is further configured to compare the pressure differential to a predetermined value.

In another embodiment, the present subject matter discloses a method for monitoring the health of a valve. The method includes obtaining a plurality of fluid parameter measurements of at least one of an isolation cavity and a source cavity, the isolation cavity being in flow communication with the source cavity, determining a trend of the plurality of fluid parameter measurements over time, and establishing a maintenance condition for a valve based, at least in part, on the trend of the fluid parameter measurements over time.

In still another embodiment, the present subject matter discloses a gas turbine having a source cavity, an isolation cavity in flow communication with the source cavity, and a valve configured to selectively adjust a fluid flow between the isolation cavity and the separation cavity. The gas turbine also has a controller configured to obtain a plurality of fluid parameter measurements of at least one of the isolation cavity and the source cavity. The controller is further configured to determine a trend of the plurality of fluid parameter measurements over time and establish a maintenance condition for the valve based, at least in part, on the trend of the fluid parameter measurements over time.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
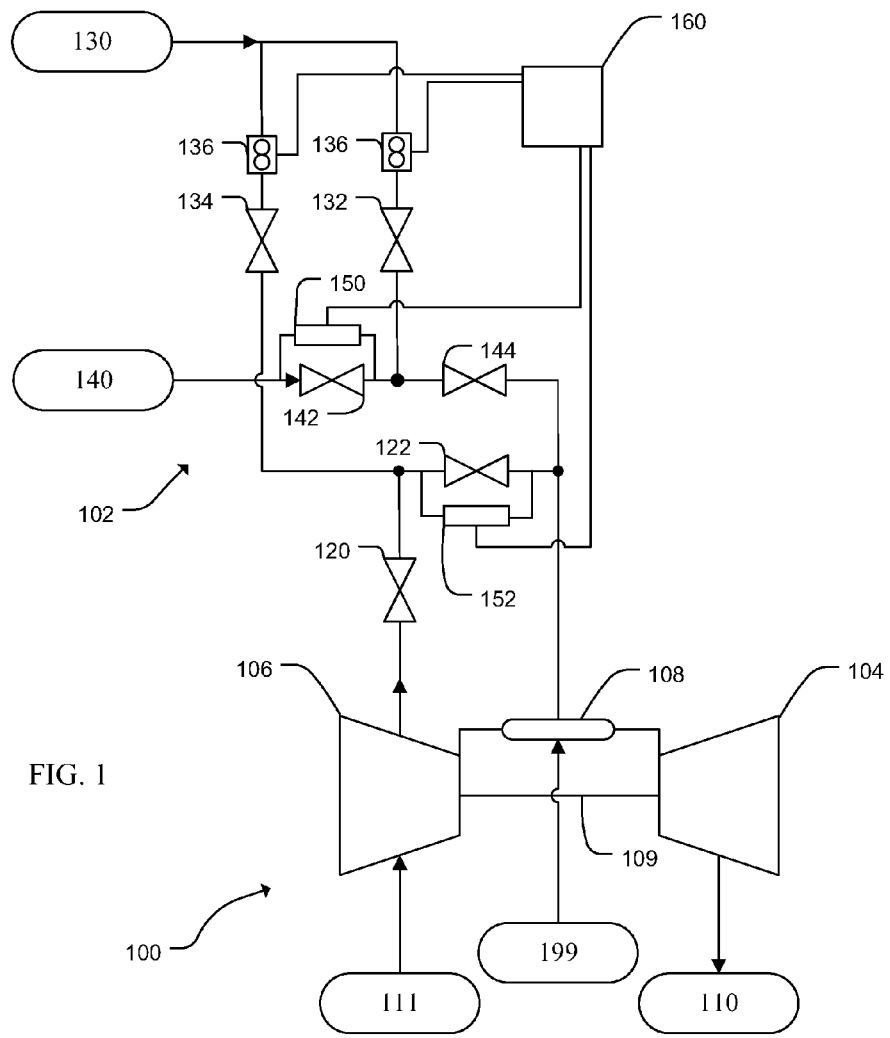
FIG. 1 illustrates a block diagram of a fuel system of a gas turbine according to an exemplary embodiment of the present disclosure with all valves of the fuel system in an open configuration.

The present subject matter is generally directed to fuel systems for a gas turbine and related methods for monitoring fluid separation in the fuel systems. More particularly, the systems and methods include measuring pressure differentials and comparing the measurements to a predetermined value. Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a schematic piping diagram illustrating an exemplary embodiment of a fuel system 102 of a gas turbine system 100 that is configured in accordance with aspects of the present disclosure. However, it should be understood that the methods and systems disclosed herein are not limited to use with gas turbines or any other type of power plant per se. In addition, it should be understood that the methods and systems disclosed herein may also be implemented in a variety of other piping layouts and configurations other than the exact configuration illustrated herein.

Figure 2:
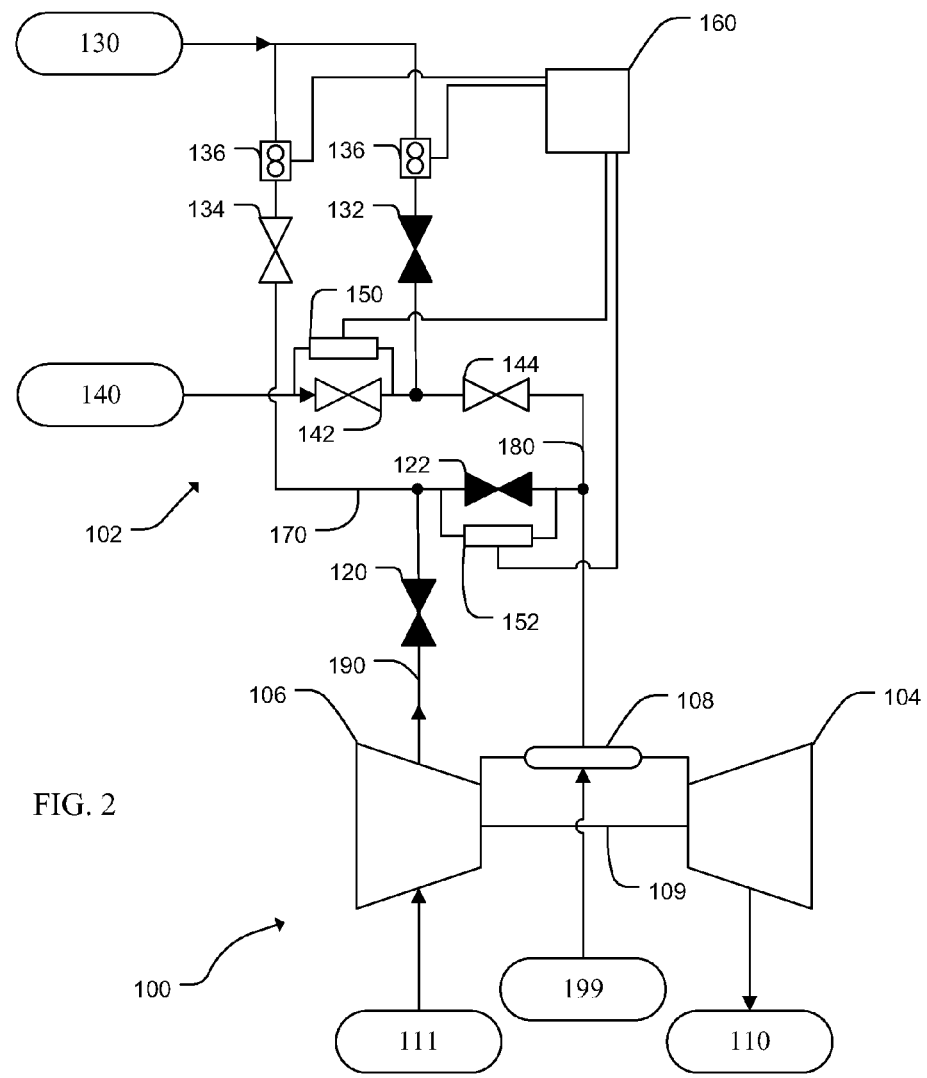
FIG. 2 illustrates a block diagram of the fuel system of FIG. 1 in a normal operating mode with particular valves, designated by black filling, in a closed configuration.
Figure 3:
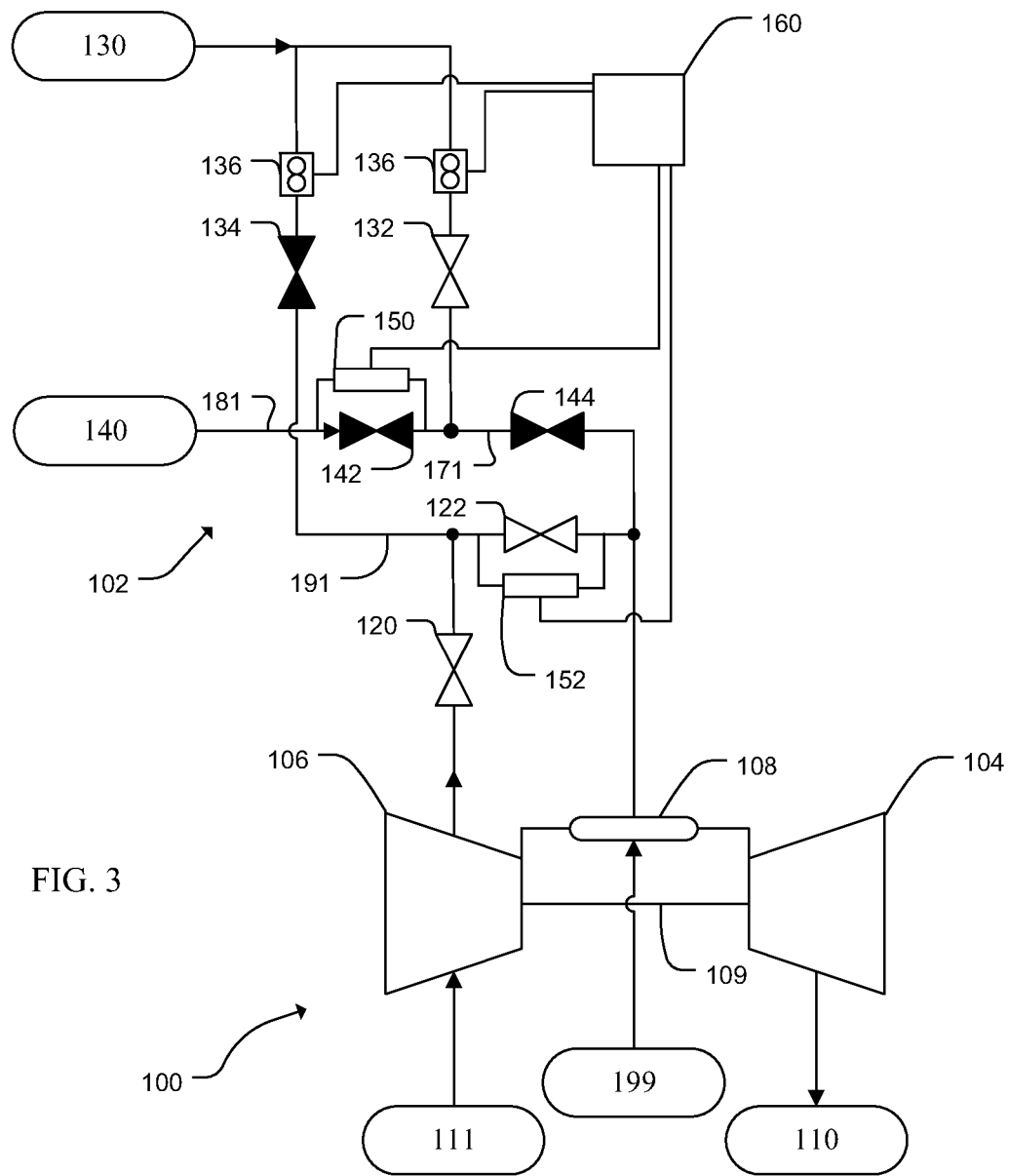
FIG. 3 illustrates a block diagram of the fuel system of FIG. 1 in an inert purge mode with particular valves, designated by black filling, in a closed configuration.

In FIG. 1, all valves of the fuel system 102 are in an open configuration. In FIGS. 2 and 3, particular valves of the fuel system 102 are in a closed configuration, designated by black filling. The valve configurations of FIGS. 2 and 3 each correspond to a particular operating mode of the fuel system 102 as will be described in greater detail below.

As may be seen in FIG. 1, the gas turbine system 100 includes a turbine 104, a combustor 108, and a compressor 106. The combustor 108 is configured to receive a fuel, an inert gas, and air from the fuel system 102. The fuel and air received by the combustor 108 are burned and discharged into the turbine 104 and subsequently a turbine exhaust outlet port 110. The combustion of fuel and air in the combustor 108 is used to power the turbine 104. In turn, the turbine 104 is in operative communication with the compressor 106 through a shaft 109 such that the turbine 104 provides power to the compressor 106. The compressor 106 is configured to receive air at a compressor air inlet port 111 and increase the pressure of such air as it passes through the compressor 106. A portion of the pressurized discharge air of the compressor 106 may be sent to the combustor 108 through an upstream compressor discharge purge valve 120 and a downstream compressor discharge purge valve 122.

As may be seen in FIG. 1, the fuel system 102 also receives a fuel from a fuel source 140. The fuel may be syngas, natural gas, or any other suitable fuel. The fuel valve 142 and control valve 144 are configured to selectively adjust the flow of fuel from the fuel source 140 into the combustor 108.

As shown in FIG. 1, the fuel system 102 also includes an inert fluid source 130 for supplying an inert fluid that may be used to purge portions of the fuel system 102. The inert fluid may be nitrogen, steam, carbon dioxide, or any other inert media. In the illustrated exemplary embodiment, the inert fluid from the inert fluid source 130 is supplied through two branches leading to the inert fluid supply valves 132 and/or 134. The inert fluid supply valves 132,134 are configured to selectively adjust a flow of inert fluid from the inert fluid source 130.

The gas turbine system 100 may also include a controller 160. As described in greater detail below, the controller 160 is configured to receive signals from inputs or sources and, at least in part in response to such signals, perform certain functions. For example, the controller 160 may be communicatively coupled to the sources, for example, via wired connections as shown in FIG. 1 or via wireless connections in order to receive such signals. In such exemplary embodiments, the controller 160 may include a memory and microprocessor, CPU or the like, such as a general or special purpose microprocessor operable to execute programming instructions or micro-control code associated with the gas turbine system 100. The memory may represent random access memory such as DRAM, or read only memory such as ROM or FLASH. In one embodiment, the processor executes programming instructions stored in memory. The memory may be a separate component from the processor or may be included onboard within the processor.

In the illustrated exemplary embodiment of FIG. 1, the controller 160 is configured to receive signals from sources such as a first differential pressure transducer 150 and a second differential pressure transducer 152. The first and second differential pressure transducers 150,152 are configured to determine a respective differential pressure across a respective valve of the differential pressure transducer 150, 152 when the valve is in a closed configuration. For example, the first differential pressure transducer 150 is configured to determine a first differential pressure measurement across the fuel valve 142, and the second differential pressure transducer 152 is configured to determine a second differential pressure measurement across the downstream compressor discharge purge valve 122. It should be appreciated by those skilled in the art that the gas turbine system 100 may include additional differential pressure transducers configured to determine differential pressures across any suitable valve of the gas turbine system 100 (e.g., the upstream compressor discharge purge valve 120, the downstream compressor discharge purge valve 122, or the control valve 144).

In addition, as shown in FIG. 1, the controller 160 may be configured to receive signals from flow measuring devices 136 of the inert fluid supply valves 132,134. The flow measuring devices may be, for example, flow rate or mass flow sensors. Each of the flow measuring devices 136 may be configured to measure a flow of inert fluid through a corresponding inert fluid supply valve 132 or 134. Thus, the controller 160 may receive signals from the flow measuring devices 136 where each signal corresponds to a flow of inert fluid through a particular one of the inert fluid supply valves 132,134. In alternative embodiments, the controller 160 may also be configured to receive signals from additional flow measuring devices that are configured to determine respective fluid flows through any part of the fuel system 102.

FIG. 2 illustrates an exemplary embodiment of the fuel system 102 of FIG. 1 in a normal operating mode or configuration such that particular valves are closed. The valves of FIG. 2 that are in a closed configuration are designated with black fill. In the normal operating mode, fuel is provided from the fuel source 140 to a fuel cavity 180, inert fluid from the inert fluid source 130 is supplied to an inert cavity 170, and pressurized discharge air from the compressor 106 is supplied to an air cavity 190.

In addition as may be seen in FIG. 2, in the normal operating mode of the gas turbine system 100, the upstream and downstream compressor discharge purge valves 120,122 are in a closed configuration. The second differential pressure transducer 152 is configured to determine the second differential pressure measurement corresponding to the difference in pressure between the inert fluid of the inert fluid cavity 170 and the fuel of the fuel cavity 180. Thus, the controller 160 is configured to obtain the second pressure differential between the fuel cavity 180 and the inert cavity 170 from the second 152.

It should be appreciated that in the embodiments described above or any other embodiments, the second differential pressure transducer 152 is not required to obtain the second pressure differential between the fuel cavity 180 and the inert cavity 170. For example, the controller 160 may be configured to obtain the second pressure differential between the fuel cavity 180 and the inert cavity 170 by obtaining the pressure of the fuel cavity 180 (e.g. using a pressure transducer) and obtaining the pressure of the inert cavity 170 (e.g. using another pressure transducer) and comparing the pressure of the fuel cavity 180 and the pressure of the inert cavity 170 in order to determine the second pressure differential. Similar methods may be used to determine any other differential pressure within the fuel system 102. Thus, in exemplary embodiments, separate pressure transducers or sensors may be used to obtain pressure measurements in any cavity of the fuel system 102, and such pressure measurements may then be transmitted to the controller 160 in order to determine respective differential pressures between cavities of the fuel system 102. Also, in the normal operating mode, the controller 160 may be configured to receive differential pressures from any of the additional differential pressure transducers described above.

In additional exemplary embodiments, the fuel of the fuel source 140 may contain more than about five percent hydrogen per unit volume. In such exemplary embodiments, the fuel system 102 may include a backup fuel source 199 in fluid communication with the combustor 108. In such embodiments, the backup fuel source 199 contains a backup fuel with less than about five percent hydrogen per unit volume, and the controller 160 may be configured to adjust the fuel system 102 from a normal operating mode (e.g., the mode shown in FIG. 2) to an inert purge mode in which the combustor 108 operates on the backup fuel. The controller 160 may adjust the fuel system 102 to the inert purge mode if fluid separation between the fuel of the fuel source 140 and another system fluid (e.g., compressed air from the compressor 106) is in jeopardy because the backup fuel having less than about five percent hydrogen per unit volume may be less hazardous and/or regulated than the fuel having more than about five percent hydrogen per unit volume.

FIG. 3 illustrates an exemplary embodiment of the fuel system 102 of FIG. 1 in an inert purge mode or configuration (e.g., the configuration that occurs during operation on a backup fuel source 199) wherein particular valves of the fuel system 102 are closed. In FIG. 3, the inert fuel supply valve 132 and the upstream and downstream compressor discharge purge valves 120,122 are in an open configuration. The other valves 134,142,144 of the fuel system 102 are in a closed configuration. The controller 160 may adjust the fuel system 102 from a normal operating mode (e.g., the configuration shown in FIG. 2) to such inert purge mode, at least in part, in response to the pressure differential dropping as described below or planned operation on a backup fuel concurrent with fuel pressure above a pre-determined threshold upstream of the fuel valve 142. In the inert purge mode shown in FIG. 3, compressed discharge air from the turbine 106 is supplied to the combustor 108 in order to maintain a positive pressure ratio over a fuel nozzle (not shown) in the combustor 108 during operation of the gas turbine system 100 on the backup fuel. In addition, in the inert purge mode, the fuel source 140 is segregated from the discharge air to avoid unintended combustion. Thus, the fuel valve 142 and control valve 144 are in a closed configuration in order to segregate the fuel from the rest of the fuel system 102.

In the inert purge mode, the first differential pressure transducer 150 is configured to determine the first differential pressure measurement corresponding to the difference in pressure between the inert fluid of an inert purge fluid cavity 171 and the fuel of a fuel purge cavity 181. Thus, in the exemplary embodiment illustrated in FIG. 3, the controller 160 is configured to obtain the first pressure differential between the fuel purge cavity 181 and the inert purge cavity 171 with the first differential pressure transducer 150. Also, in the inert purge mode, the controller 160 may be configured to receive differential pressures from any of the additional differential pressure transducers described above.

In the backup operating mode, the gas turbine system 100 does not operate on the fuel from the fuel source 140. Thus, in the backup operating mode, the fuel is segregated from the pressurized discharge air to avoid mixing of the fluids. The fuel valve 142 is adjusted to the closed configuration in order to segregate the fuel from the rest of the fuel system 102.

In the back up fuel mode, the first differential pressure transducer 150 is used to monitor the pressure differential between the fuel and the inert fluid separated by the fuel valve 142. As described below, should the first differential pressure drop below a predetermined value, the controller may reduce the load of the gas turbine, or take other predetermined action to protect against risk of fuel source 140 contacting the discharge air from the compressor 106.

Figure 4:
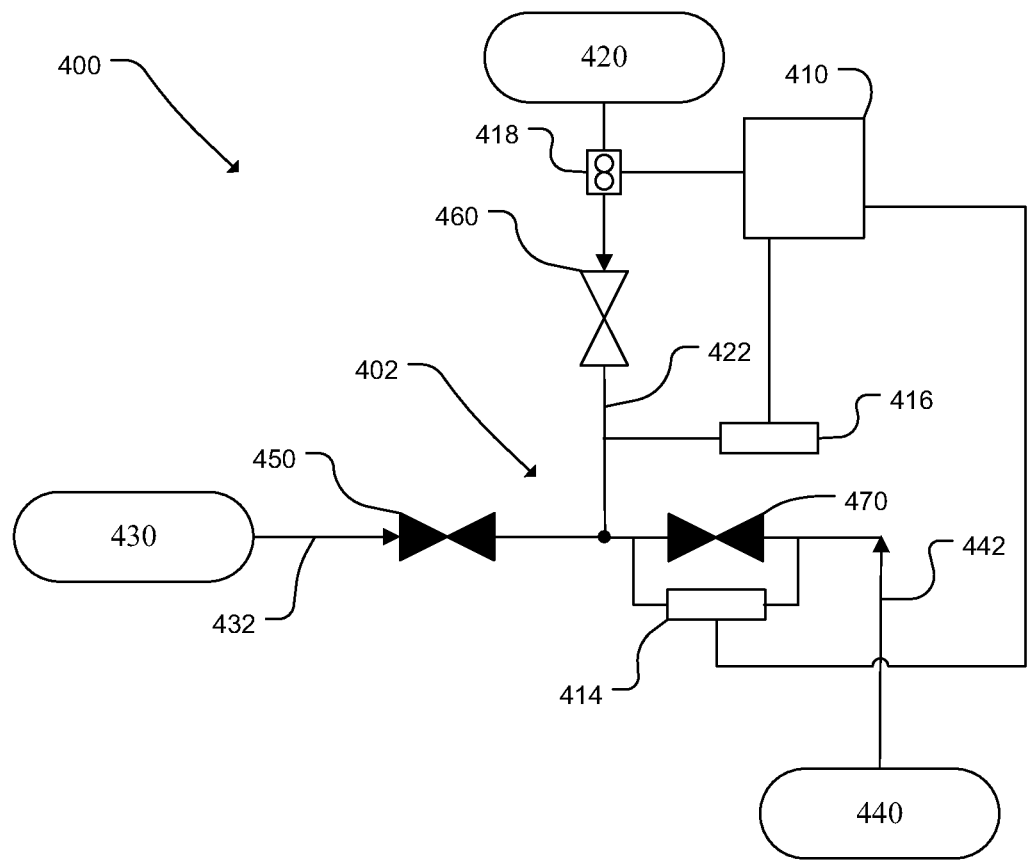
FIG. 4 illustrates a block diagram of a gas turbine according to an exemplary embodiment of the present disclosure configured to isolate a first fluid from a second fluid.

FIG. 4 illustrates a block diagram of a fluid system 402 of a gas turbine 400 according to a particular exemplary embodiment of the present disclosure. In the embodiment shown in FIG. 4, the fluid system 402 includes a first valve 450 that is configured to selectively adjust a flow between a first fluid source cavity 432 and an isolation cavity 422. The first fluid source cavity 432 of the fluid system 402 is configured to receive a first fluid from a first fluid source 430. The first fluid may be a fuel or any other fluid. In the embodiment shown in FIG. 4, the fluid system 402 also includes a second valve 470 that is configured to selectively adjust a flow between a second fluid source cavity 442 and the isolation cavity 422. The second fluid source cavity 442 of the fluid system 402 is configured to receive a second fluid from a second fluid source 440. The second fluid may be air or any other suitable fluid. In addition, the fluid system 402 of the gas turbine 400 of FIG. 4 also includes a third valve 460 that is configured to selectively adjust a flow of a fluid into the isolation cavity 422 from a fluid source 420. The fluid may be nitrogen, steam, carbon dioxide, water, air, or any other inert media.

In the exemplary embodiment shown in FIG. 4, the first and second valves 450,470 are in a closed configuration. Thus, the first fluid source cavity 432 is supplied with the first fluid from the first fluid supply 430, and the second fluid source cavity 442 is supplied with the second fluid from the second fluid supply 440. As may be seen in FIG. 4, the third valve 460 is in an open configuration such that fluid from the fluid supply 420 is supplied to the isolation cavity.

As may be seen in FIG. 4, the fluid system 402 of the gas turbine 400 also includes a controller 410. The controller 410 may be similar to the controller 160 of the embodiments discussed above. The controller 410 is configured to receive signals from sources such as a pressure transducer 416 and a differential pressure transducer 412. The pressure transducer 416 is configured to obtain a pressure measurement of the fluid isolation cavity 422, and the differential pressure transducer 412 is configured to determine a differential pressure measurement across the second valve 470. In alternative embodiments, the controller 400 may be configured to receive signals from additional pressure transducers configured to determine respective pressures of any other cavity of the fluid system 402. The controller 410 may also be configured to receive signals from additional differential pressure transducers configured to determine differential pressures across any suitable valve of the fluid system 402 (e.g., the first valve 450).

In addition, as shown in FIG. 4, the controller 400 is configured to receive signals from a flow measuring device 418 that determines the flow of the fluid through the third valve 460. In alternative embodiments, the controller 400 may be configured to receive signals from additional flow measuring devices that are configured to determine respective fluid flows through any other valve of the fluid system 402.

Figure 5:
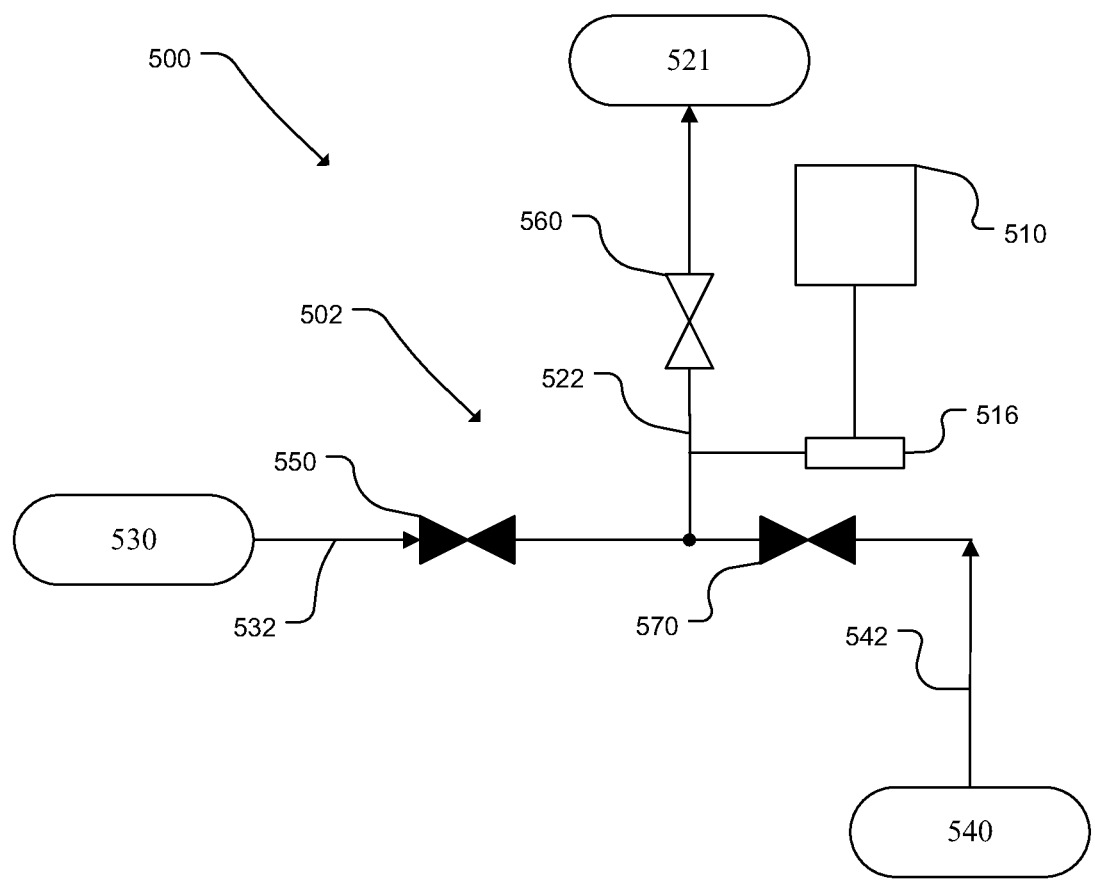
FIG. 5 illustrates a block diagram of a gas turbine according to an exemplary embodiment of the present disclosure configured to isolate a first fluid from a second fluid.

FIG. 5 illustrates a block diagram of a fluid system 502 of a gas turbine 500 according to a particular exemplary embodiment of the present disclosure. In the embodiment shown in FIG. 5, the fluid system 502 includes a first valve 550 that is configured to selectively adjust a flow between a first fluid source cavity 532 and an isolation cavity 522. The first fluid source cavity 532 of the fluid system 502 is configured to receive a first fluid from a first fluid source 530. The first fluid may be a fuel or any other fluid. In the embodiment shown in FIG. 5, the fluid system 502 also includes a second valve 570 that is configured to selectively adjust a flow between a second fluid source cavity 542 and the isolation cavity 522. The second fluid source cavity 542 of the fluid system 502 is configured to receive a second fluid from a second fluid source 540. The second fluid may be air or any other suitable fluid. In addition, the fluid system 502 of the gas turbine 500 of FIG. 4 also includes a third valve 560 that is configured to selectively adjust a flow out of the isolation cavity 522 to an atmospheric vent or drain 521. In FIG. 5, the isolation cavity 522 is at a lower pressure relative to the first and second fluid source cavities 532,542 due to the atmospheric vent 521.

As may be seen in FIG. 5, the fluid system 502 of the gas turbine 500 also includes a controller 510. The controller 510 may be similar to the controllers 160 or 410 of the embodiments discussed above. The controller 510 is configured to receive signals from sources such as a pressure transducer 516. The pressure transducer 516 is configured to obtain a pressure measurement of the fluid isolation cavity 522. In alternative embodiments, the controller 510 may be configured to receive signals from additional pressure transducers configured to determine respective pressures of any other cavity of the fluid system 502.

As discussed above, the controller 510 may determine the pressure of the isolation cavity 522 using the pressure transducer 516. Because the pressure of the isolation cavity is less than that of the first and second fluid source cavities 532,542, if the pressure of the isolation cavity 522 is increasing, it may be inferred that the first fluid and/or the second fluids are leaking into the isolation cavity 522. Thus, the first and second valves 550,570 may not be properly sealing and may require maintenance or replacement as described further below.

To reiterate the statement made above, it should be understood that the methods and systems disclosed above are not limited to use with gas turbines or any other type of power plant per se. In addition, it should be understood that the methods and systems disclosed above may also be implemented in a variety of other piping layouts and configurations other than the exact configuration illustrated here.

Figure 6:
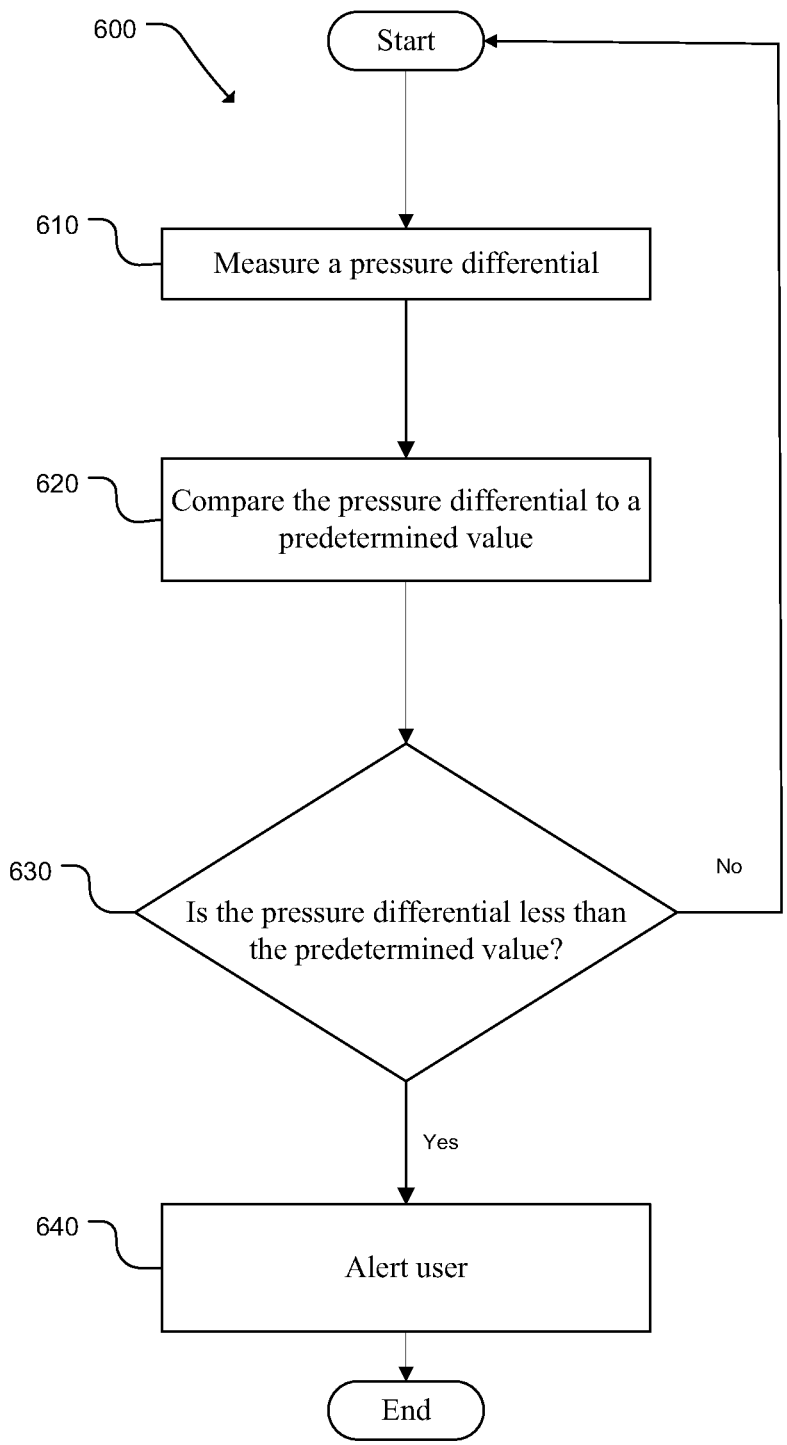
FIG. 6 provides a flow chart of a method for monitoring fluid separation in a gas turbine system according to an exemplary embodiment of the present disclosure.

Turning now to FIG. 6, a flow chart of an exemplary method according to exemplary aspects of the present disclosure is provided. The method 500 may be implemented by the controller 160 of the fuel system 102 described above or the controller 410 of the gas turbine 400 described above. In particular exemplary embodiments, the method includes obtaining a pressure differential between a first fluid source cavity and an isolation cavity and comparing the pressure differential to a predetermined value.

Beginning at 610, a pressure differential is obtained. In an exemplary embodiment, the pressure differential is a pressure differential between an isolation cavity (e.g. an inert cavity) and a first fluid source cavity (e.g., a fuel cavity) where the isolation cavity and first fluid source cavity are in flow communication. Thus, for example, as described above with reference to FIG. 2, the pressure differential between the fuel cavity 180 and the inert cavity 170 may be obtained using the first differential pressure transducer 150, or with reference to FIG. 4, the pressure differential may be obtained between the first fluid source cavity 432 and the isolation cavity 422 using differential pressure transducer 412. Similarly, the first differential pressure transducer 150 may be used to obtain the differential pressure between the fuel purge cavity 181 and the inert purge cavity 171 of FIG. 3. In various embodiments, the pressure differential may be obtained using a differential pressure transducer, using pressure transducers and the method described above, or using any other suitable method.

At 620, the differential pressure is compared to a predetermined value, for example, using the controller 160 of FIG. 2 or the controller 410 of FIG. 4. With reference to FIG. 4, in exemplary embodiments, the predetermined value is a value that is selected in order to maintain fluid separation between the first fluid of the first fluid source cavity 432 and the second fluid of the second fluid source cavity 442. Thus, the predetermined value may be selected such that a pressure of the isolation cavity 422 is greater than a pressure of the first fluid source cavity 432 and a pressure of the second fluid source cavity 442. For example, the predetermined value may be selected such that the pressure of the isolation cavity 422 is kept at a suitable percentage more than the greater of the pressure of the first fluid source cavity 432 and the pressure of the second fluid source cavity 442 (e.g., about 5%, 10%, 20%, or 25% percent more than the greater of the pressure of the first fluid source cavity 432 and the pressure of the second fluid source cavity 442).

At 630, if the pressure differential is determined to be less than the predetermined value, it may be inferred that fluid separation between the first and second fluids may be in jeopardy. However, if the pressure differential is determined to be more than the predetermined value, it may be inferred that fluid separation is being maintained.

At 640, an alert may be issued if the pressure differential drops below the predetermined value. Thus, for example, if the pressure differential drops below the predetermined value and fluid separation between the first and second source cavities may be in jeopardy, the controller may issue an alert or warning that alerts a turbine operator of the drop in the pressure differential. The alert may be an alarm, a siren, a visual indicator, or any other suitable alert. In alternative embodiments, the controller may adjust the turbine from a normal operating mode if the pressure differential drops below the predetermined value. For example, the controller may adjust the turbine to a different load output if the pressure differential drops below the predetermined value. For example, referring to FIG. 2, when the pressure differentials drops below the predetermined value, fluid separation between the fuel of the fuel source 140 and the air from the compressor 106 may be in jeopardy. Thus, for example, the controller 160 may adjust the fuel system 102 to the inert purge configuration shown in FIG. 3 in order to further isolate the fuel of the fuel source 140 from the discharge air of the air cavity 180 and operating on a backup fuel, or the controller 160 may adjust the fuel system 102 to change the turbine load.

In additional exemplary embodiments, the first fluid may be a fuel that contains more than about five percent hydrogen concentration per unit volume. Also, the predetermined value may be a first predetermined value. In such exemplary embodiments, the controller may be further configured to transfer to a backup fuel source 199 with less than about five percent hydrogen concentration per unit volume if the pressure differential drops below a second predetermined value or shut down if the pressure differentials drop below a third predetermined value. The first, second, and third predetermined values may be determined such that the values correspond to increasing risk of potential fluid separation failure and thus potential danger. Accordingly, unintentional fluid separation failure may be least likely to result from the pressure differential dropping below the first predetermined value, and unintentional fluid separation failure may be most likely to result from the pressure differential dropping below the third predetermined value. Accordingly, the respective responses to the pressure differential dropping below the first, second, and third predetermined values represent increasing safety responses. Thus, activating an alert represents the least extreme safety response and shutting down the gas turbine system 100 is the most extreme safety response because such response corresponds to the most dangerous situation.

In the exemplary embodiments described above and in other exemplary embodiments, the valves of the fuel system 102 should function properly for the fuel system 102 to operate safely. For example, in the normal operating mode of the fuel system 102 shown in FIG. 2, the downstream compressor discharge purge valve 122 is in a closed configuration and should substantially segregate the pressurized discharge air of the compressor 106 from the inert fluid. However, over time, valves in the fuel system 102 may cease to function at an acceptable level, and the valves may require repair, maintenance, or replacement. To assist in determining whether a valve is in need of repair, maintenance, or replacement, the controller 160 may be configured to monitor a key parameter of the valves in the fuel system 102 over time in order to determine a maintenance condition of the valves.

Figure 7:
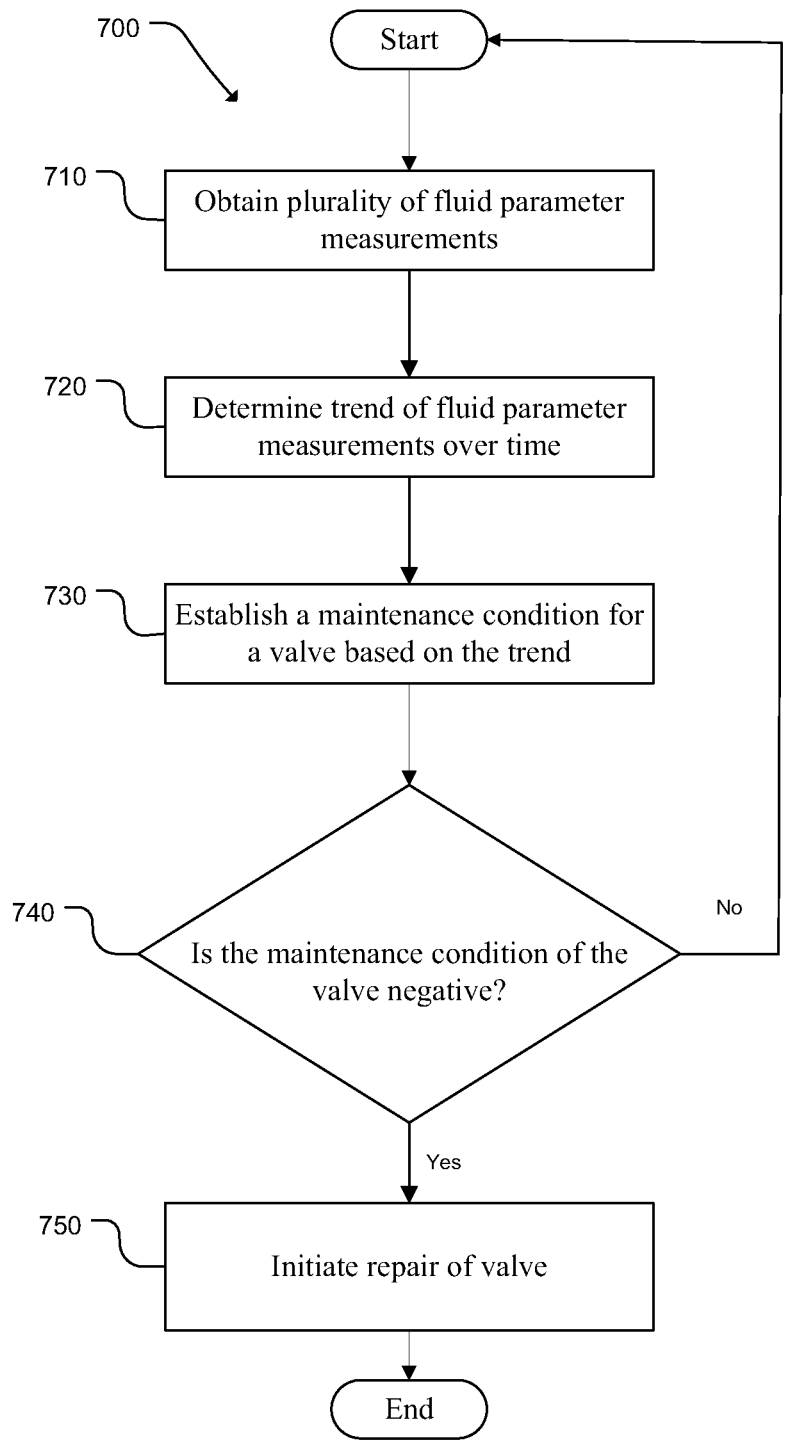
FIG. 7 provides a flow chart of a method for monitoring the health of a valve according to an exemplary embodiment of the present disclosure.

FIG. 7 provides a flow chart of an exemplary method according to exemplary aspects of the present disclosure. The method 600 may be implemented by the controller 160 of the fuel system 102 described above or the controller 410 of the gas turbine 400 described above. In particular exemplary embodiments, the method includes obtaining a plurality of fluid parameter measurements, determining a trend of the plurality of fluid parameter measurements over time; and establishing a maintenance condition for a valve based, at least in part, on the trend of the fluid parameter measurements over time.

Beginning at 710, a plurality of fluid parameter measurements is obtained. In various embodiments, the plurality of fluid parameter measurements may be a plurality of differential pressure measurements, a plurality of pressure measurements, or a plurality of fluid flow measurements. Thus, for example, the method may include obtaining a plurality of differential pressure measurements between a source cavity (e.g., a fuel cavity 180, an air cavity 190, or a first or second fluid source cavity 430,440) and an isolation cavity (e.g., the inert cavity 170 or the inert fluid cavity 422). In exemplary embodiments, the plurality of differential pressure measurements may be obtained, for example, using a differential pressure transducer (e.g., the first or second differential pressure transducers 150,152,412) or pressure transducers and the method described above. In addition, the method may also include obtaining a plurality of pressure measurements of at least one of the source cavity and the isolation cavity (e.g., using the pressure transducer 416) or obtaining a plurality of fluid flow measurements between the source cavity and the isolation cavity (e.g., using the flow measuring devices 136, 418 or a flowmeter). In alternative embodiments, multiple pluralities of fluid parameter measurements may be obtained. For example, the plurality of differential pressure measurements and plurality of fluid flow measurements may be obtained. In alternative embodiments, any suitable combination of the plurality of differential pressure measurements, the plurality of pressure measurements, and the plurality of fluid flow measurements may be obtained.

At 720, a trend of the plurality of fluid parameters over time is determined. For example, if the values of the plurality of fluid parameter measurements are increasing over time, the trend of the plurality of fluid parameter measurements is positive, or, if the values of the plurality of fluid parameter measurements are decreasing over time, the trend of the plurality of fluid parameter measurements is negative. Also, in such example, if the values of the plurality of fluid parameter measurements are substantially constant over time, the trend of the plurality of fluid parameter measurements is substantially constant.

At 720, the controller 160 or 410 may adjust the inert fluid supply valves 132,134 or the third valve 460 to a closed configuration in order to obtain fluid parameter measurements (e.g., a differential pressure across the valves 132,134, or 460). The controller 160 or 410 may adjust the valves 132,134, or 460 for a short period of time. The controller 160 or 410 may trend the rate of pressure decay across a respective one of the valves 132,134, or 460 over time in order to accumulate further trend data. Such data may be used to infer if maintenance is required, for example, in the manner described below.

At 730, a maintenance condition for a valve is established. In exemplary embodiments, a maintenance condition may indicate the physical condition of the valve (e.g., any valve of the fuel system 102 of FIG. 2 or the fluid system 402 of FIG. 4). Thus, a negative maintenance condition may indicate that the valve should be inspected, repaired, or replaced whereas a positive maintenance condition may indicate that the valve is functioning at an acceptable level. In a first example, if the plurality of fluid parameter measurements is a plurality of differential pressure measurements and the plurality of differential measurements are positive, a decreasing trend establishes a negative maintenance condition for the valve because the decreasing trend may indicate that fluid is leaking from the cavity with a higher pressure through the valve and into the cavity with a lower pressure whereas a substantially constant trend establishes a positive maintenance condition for the valve. For example, if the trend of a plurality of differential pressure measurements between the inert cavity 170 and the fuel cavity 180 of the fuel system 102 of FIG. 2 is increasing, it may be inferred that inert gas is leaking into the fuel cavity 180 through the valve 142 because of the decreasing differential pressure measurements over time. In a second example, if the plurality of fluid parameter measurements is a plurality of differential pressure measurements and the plurality of differential measurements are negative, an increasing trend establishes a negative maintenance condition for the valve because the increasing trend may indicate that fluid is leaking from the cavity with a higher pressure through the valve and into the cavity with a lower pressure whereas a substantially constant trend establishes a positive maintenance condition for the valve. In a third example, if the plurality of fluid parameter measurements is a plurality of pressure measurements, a decreasing trend establishes a negative maintenance condition for the valve because the decreasing trend may indicate that fluid is leaking from the cavity being measured through the valve and into another cavity whereas a substantially constant trend establishes a positive maintenance condition for the valve. For example, if the trend of a plurality of pressure measurements of the inert cavity 170 of the fuel system 102 of FIG. 2 is decreasing, it may be inferred that the inert gas is leaking into the fuel cavity 180 through the control valve 142 or leaking into the air cavity 190 through the downstream compressor discharge valve 122 because of the decreasing pressure measurements over time. In a fourth and final example, if the plurality of fluid parameter measurements is a plurality of fluid flow measurements, an increasing trend establishes a negative maintenance condition for the valve because the increasing trend may indicate that more fluid is flowing into the cavity over time and thus the valve may be leaking whereas a substantially constant trend establishes a positive maintenance condition for the valve. For example, if the trend of a plurality of fluid flow measurements into the inert cavity 170 of the fuel system 102 of FIG. 2 is increasing, it may be inferred that the inert gas is leaking into the fuel cavity 180 through the control valve 142 or leaking into the air cavity 190 through the downstream compressor discharge valve 122 because of the increasing fluid flow measurements over time.

At 740, if the valve is determined to have a negative maintenance condition, it may be inferred that the valve should be physically examined, repaired, or replaced, or, if the valve is determined to have a positive maintenance condition, it may be inferred that the valve may be in good working order.

At 750, if the valve is determined to have a negative maintenance condition, at least in part in response to such determination, the valve may be physically examined, repaired, or replaced.

Again, it should be understood that the method and system disclosed herein are not limited to use with gas turbines or any other type of power plant per se. In addition, it should be understood that the method and system disclosed herein may also be implemented in a variety of other piping layouts and configurations other than the exact configuration illustrated above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of monitoring fluid separation in a gas turbine, the gas turbine having a fuel source cavity, a fluid source cavity, and an isolation cavity, the isolation cavity disposed between the fuel source cavity and the fluid source cavity when the gas turbine is in a normal operating mode, a valve of the gas turbine configured for selectively blocking fluid flow between the fuel source cavity and the isolation cavity, the method comprising:
    operating the gas turbine in the normal operating mode, a fuel within the fuel source cavity flowing to a combustor of the gas turbine and inert fluid filling the isolation cavity in the normal operating mode, the valve being in a closed configuration while the gas turbine is in the normal operating mode;
    obtaining a pressure differential between the fuel within the fuel source cavity of the gas turbine and the inert fluid within the isolation cavity of the gas turbine when the gas turbine is in the normal operating mode;
    comparing the pressure differential to a predetermined value;
    shifting the gas turbine to an inert purge mode if the pressure differential is less than the predetermined value, the fuel within the fuel source cavity not flowing to the combustor of the gas turbine in the inert purge mode, the valve being in an open configuration in the inert purge mode; and
    transferring operation of the gas turbine to a backup fuel from a backup fuel source if the pressure differential drops below the predetermined value,
    wherein the fuel within the fuel source cavity contains more than five percent hydrogen concentration per unit volume and the backup fuel within the backup fuel source has less than five percent hydrogen concentration per unit volume.

2. The method of claim 1, wherein the predetermined value is selected such that fluid separation is maintained between the fuel of the fuel source cavity and a fluid of the fluid source cavity.

3. The method of claim 2, wherein the predetermined value is selected such that an isolation cavity pressure is about five percent, about ten percent or about twenty percent more than the greater of a fuel source cavity pressure and a fluid source cavity pressure.

4. The method of claim 1, wherein obtaining the pressure differential between the fuel source cavity and the isolation cavity comprises:
    obtaining a fuel source cavity pressure;
    obtaining an isolation cavity pressure; and
    comparing the fuel source cavity pressure and the isolation cavity pressure.

5. The method of claim 1, wherein obtaining the pressure differential between the fuel source cavity and the isolation cavity comprises obtaining the pressure differential between the fuel source cavity and the isolation cavity with a differential pressure transducer.

6. A fuel system comprising:
    a fuel cavity having a fuel contained therein;
    a fluid cavity having a fluid contained therein;

an inert cavity disposed between the fuel cavity and the fluid cavity, the inert cavity being configured to selectively maintain fluid separation between the fuel and the fluid;

a valve positioned between the fuel cavity and the inert cavity, the valve configured for selectively blocking fluid flow between the fuel cavity and the inert cavity; and a controller configured to obtain a pressure differential between the fuel cavity and the inert cavity, the controller being further configured to compare the pressure differential to a predetermined value, the controller also configured for shifting the fuel system from a normal operating mode to an inert purge mode if the pressure differential drops below the predetermined value, the controller maintaining the valve in a closed configuration in the normal operating mode and in an open configuration in the inert purge mode, the controller further configured to transfer operation of the fuel system to a backup fuel from a backup fuel source in the inert purge mode, wherein the fuel within the fuel cavity contains more than five percent hydrogen concentration per unit volume and the backup fuel within the backup fuel source has less than five percent hydrogen concentration per unit volume.

7. The fuel system of claim 6, wherein the controller is further configured to activate an alert if the pressure differentials drop below the predetermined value.

8. The fuel system of claim 7, wherein the predetermined value is a first predetermined value, the controller further configured to shut down the gas turbine if the pressure differential drops below a second predetermined value.

9. The fuel system of claim 6, wherein the predetermined value is selected such that fluid separation is maintained between the fuel of the fuel cavity and the fluid of the fluid cavity.

10. The fuel system of claim 9, wherein the predetermined value is selected such that an inert cavity pressure is about five percent, about ten percent or about twenty percent more than the greater of a fuel cavity pressure and a fluid cavity pressure.

11. The fuel system of claim 6, wherein the controller is configured to obtain the pressure differential between the fuel cavity and the inert cavity by obtaining a fuel cavity pressure and an inert cavity pressure and comparing the fuel cavity pressure and the inert cavity pressure.

12. The fuel system of claim 6, further comprising a differential pressure transducer configured to measure the pressure differential, the differential pressure transducer being in communication with the controller.

13. A method of monitoring fluid separation in a gas turbine, the gas turbine having a fuel source cavity, an air cavity, and an isolation cavity, the isolation cavity disposed between the fuel source cavity and the air cavity when the gas turbine is in a normal operating mode, a valve of the gas turbine positioned between the fuel source cavity and the isolation cavity when the gas turbine is in the normal operating mode, the valve configured for selectively blocking fluid flow between the fuel source cavity and the isolation cavity, the method comprising:

operating the gas turbine in the normal operating mode, a fuel within the fuel source cavity flowing to a combustor of the gas turbine, inert fluid filling the isolation cavity and compressed air from a compressor of the gas turbine filling the air cavity in the normal operating mode, the valve being in a closed configuration while the gas turbine is in the normal operating mode;

measuring a pressure differential between the fuel within the fuel source cavity of the gas turbine and the inert fluid within the isolation cavity of the gas turbine when the gas turbine is in the normal operating mode;

comparing the pressure differential to a first predetermined value and a second predetermined value;

activating an alert if the pressure differential is less than the first predetermined value at said step of comparing; and shifting operation of the gas turbine to an inert purge mode if the pressure differential is less than the second predetermined value at said step of comparing, the combustor of the gas turbine receiving compressed air from the compressor of the gas turbine and a backup fuel from a backup fuel source in the inert purge mode, the valve being in an open configuration in the inert purge mode, wherein the fuel within the fuel source cavity contains more than five percent hydrogen concentration per unit volume and the backup fuel from the backup fuel source contains less than five percent hydrogen concentration per unit volume.

* * * * *